US012594787B2

(12) United States Patent
Lin et al.

(10) Patent No.: US 12,594,787 B2
(45) Date of Patent: Apr. 7, 2026

(54) SIMULATED INFLATABLE WHEEL AND STROLLER COMPRISING SAME

(71) Applicant: WONDERLAND SWITZERLAND AG, Steinhausen (CH)

(72) Inventors: Chih-Hsun Lin, Taipei (TW); Jian Yong Tang, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 167 days.

(21) Appl. No.: 17/787,117

(22) PCT Filed: Dec. 16, 2020

(86) PCT No.: PCT/CN2020/136760
§ 371 (c)(1),
(2) Date: Jun. 17, 2022

(87) PCT Pub. No.: WO2021/121258
PCT Pub. Date: Jun. 24, 2021

(65) Prior Publication Data
US 2023/0018182 A1 Jan. 19, 2023

(30) Foreign Application Priority Data

Dec. 18, 2019 (CN) .......................... 201922291775.X

(51) Int. Cl.
*B60C 17/06* (2006.01)
*B60C 7/10* (2006.01)
(52) U.S. Cl.
CPC .................................. *B60C 7/1015* (2021.08)
(58) Field of Classification Search
CPC .... B60C 7/00; B60C 7/10; B60C 7/08; B60C 7/125; B60C 7/105; B60C 7/102;
(Continued)

(56) References Cited

U.S. PATENT DOCUMENTS 1,031,469 A * 7/1912 Roberts ................... B60C 7/121
152/308
1,413,189 A * 4/1922 Rapson ................. B60C 19/122
152/157
(Continued)

FOREIGN PATENT DOCUMENTS

CN 101200162 A 6/2008
CN 201516790 U 6/2010
(Continued)

OTHER PUBLICATIONS

International Search Report mailed in corresponding International Patent Application No. PCT/CN2020/136760 on Feb. 25, 2021, consisting of 15 pp. (English Translation Provided).
(Continued)

*Primary Examiner* — Cedrick S Williams
(74) *Attorney, Agent, or Firm* — Volpe Koenig

(57) ABSTRACT

The present invention provides a simulated inflatable wheel including a rim, a filler tire mounted on the rim, and a tire casing covering the filler tire and having a rolling portion in rolling contact with the external environment and an abutting portion extending from two sides of the rolling portion. The abutting portion is located between the rim and the filler tire. The abutting portion abuts against the rim and the filler tire respectively. A recessed portion is formed on at least one position of an outer surface of the filler tire. The present invention utilizes the recessed portion of the filler tire to generate space between the filler tire and the rim (or the tire casing), for providing a buffer when the filler tire is deformed and improving elasticity of the filler tire. The present invention further provides a stroller including the simulated inflatable wheel.

10 Claims, 6 Drawing Sheets

(58) Field of Classification Search

CPC ....... B60C 7/101; B60C 7/1015; B60C 5/002; B60C 19/122; B60C 17/06

See application file for complete search history.

(56) References Cited

U.S. PATENT DOCUMENTS

| | | | | |
|---|---|---|---|---|
| 4,324,279 A * | 4/1982 | McFarlane | ............. | B60C 7/121 |
| | | | | 152/320 |
| 4,429,068 A * | 1/1984 | Nakahira | ............... | B60C 7/102 |
| | | | | 524/304 |
| 2012/0247634 A1 * | 10/2012 | Liao | ........................ | B60C 7/102 |
| | | | | 152/310 |
| 2019/0255882 A1 * | 8/2019 | Bastien | ................ | B60B 33/045 |

FOREIGN PATENT DOCUMENTS

| | | | |
|---|---|---|---|
| CN | 102416826 B | 7/2013 |
| CN | 103863000 A | 6/2014 |
| CN | 104995035 A | 10/2015 |
| CN | 107031293 A | 8/2017 |
| CN | 206589575 U | 10/2017 |
| CN | 208149420 U | 11/2018 |
| CN | 208359838 U | 1/2019 |
| CN | 109910508 A | 6/2019 |
| CN | 111055633 A | 4/2020 |
| CN | 211641703 U | 10/2020 |
| EP | 0894648 A2 | 2/1999 |
| EP | 0894648 A3 | 8/2000 |
| EP | 3317124 A1 | 5/2018 |
| EP | 4011649 A1 | 6/2022 |
| JP | 51-158003 U | 12/1976 |
| JP | 10006707 A | 1/1998 |
| JP | 11-42907 A | 2/1999 |
| JP | 11059144 A | 3/1999 |
| JP | 2000-177339 A | 6/2000 |
| JP | 2004-114849 A | 4/2004 |
| TW | I801786 B | 5/2023 |

OTHER PUBLICATIONS

Written Opinion mailed in corresponding International Patent Application No. PCT/CN2020/136760 on Feb. 25, 2021, consisting of 4 pp.

* cited by examiner

100

50

30

10

SIMULATED INFLATABLE WHEEL AND STROLLER COMPRISING SAME

CROSS REFERENCE TO RELATED APPLICATIONS

This application is a 371 U.S. National Phase of International Application No. PCT/CN2020/136670, filed on Dec. 16, 2020, which claims priority to Chinese Patent Application No. 201922291775.X, filed Dec. 18, 2019, which are incorporated by reference as if fully set forth.

BACKGROUND OF THE INVENTION

1. Field of the Invention

The present invention relates to a wheel, and more specifically, to a simulated inflatable wheel and a stroller including the simulated inflatable wheel.

2. Description of the Prior Art

With progress of times and improvement of life quality, a wheel of a stroller or a child toy has developed various designs. A conventional inflatable wheel has a tire casing and an inner tube. The tire casing is made of rubber material, and the inner tube is a hollow structure. When a user wants to use the inflatable wheel, the user needs to inflate the inner tube first. The aforesaid design not only causes the flat tire problem, but also gives trouble in frequent inflating.

In view of the aforesaid drawbacks, a simulated inflatable wheel has been developed. The simulated inflatable wheel mainly includes a tire casing, a filler tire, and a rim, wherein the filler tire is made of foaming material. After the filler tire is disposed in the tire casing and mounted on the rim together with the tire casing, the simulated inflatable wheel can be used without inflating. However, since there is no space between the filler tire and the tire casing (or between the filler tire and the rim), the simulated inflatable wheel cannot provide any buffer space for deformation of the filler tire, so as to cause poor elasticity of the filler tire.

Thus, it is necessary to develop a new type of simulated inflatable wheel for solving the aforesaid problems.

SUMMARY OF THE INVENTION

The present invention provides a simulated inflatable wheel including a rim, a filler tire mounted on the rim, and a tire casing covering the filler tire. The tire casing has a rolling portion in rolling contact with an external environment and two abutting portions extending from two sides of the rolling portion respectively. The abutting portion is located between the rim and the filler tire. One side of the abutting portion abuts against the rim, and another side of the abutting portion abuts against the filler tire. A recessed portion is formed on at least one position of an outer surface of the filler tire.

The present invention further provides a stroller. The stroller includes the aforesaid simulated inflatable wheel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
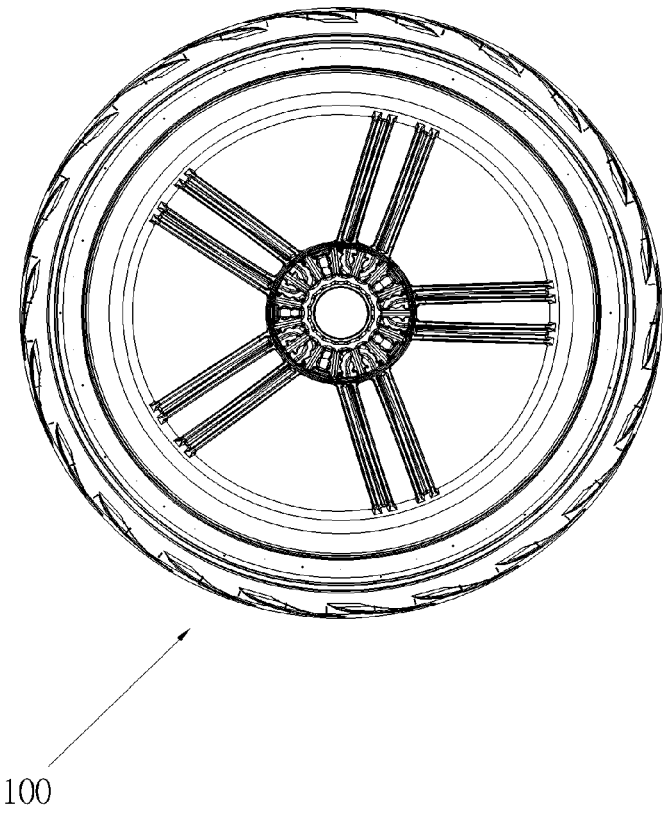
FIG. 1 is a diagram of a simulated inflatable wheel of the present invention.

The embodiments of the present invention will now be described with reference to the accompanying drawings. Components with similar reference signs in the drawings represent components with similar functions or structures.

Figure 2:
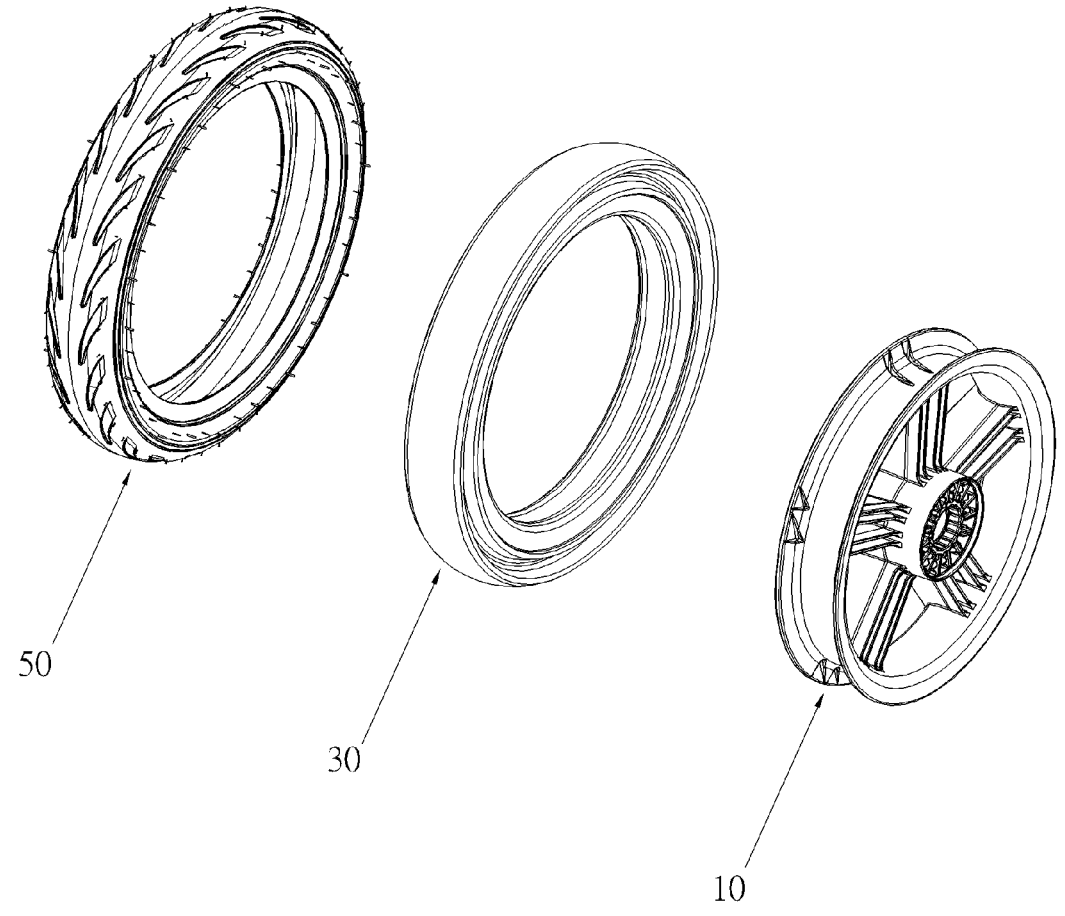
FIG. 2 is an exploded diagram of the simulated inflatable wheel in FIG. 1.

Please refer to FIGS. 1-2. A simulated inflatable wheel 100 of the present invention includes a rim 10, a filler tire 30 mounted on the rim 10, and a tire casing 50 covering the filler tire 30 to make the filler tire 30 filled between the rim 10 and the tire casing 50. Specifically, the tire casing 50 could be made of rubber, TPE, TPR or PVC material. In this embodiment, the tire casing 50 is formed by a rubber vulcanization process. The filler tire 30 is made of foaming material, so as to efficiently prevent a tire blow out since there is no need to inflate the filler tire 30. The foaming material could be TPU, PU, EVA, or PP material. The tire casing 50 has a rolling portion 51 in rolling contact with an external environment and two abutting portions 53 extending along two sides of the rolling portion 51 respectively. The abutting portion 53 is located between the rim 10 and the filler tire 30. One side of the abutting portion 53 abuts against the rim 10, and another side of the abutting portion 53 abuts against the filler tire 30. In this embodiment, an outer side of the abutting portion 53 abuts against the rim 10, and an inner side of the abutting portion 53 abuts against the filler tire 30, so as to prevent the tire casing 50 from sliding between the rim 10 and the filler tire 30. The rolling portion 51 has a plurality of concave portions 511 formed thereon to reduce the weight of the tire casing 50 and improve the slip resistance of the tire casing 50.

Figure 3:
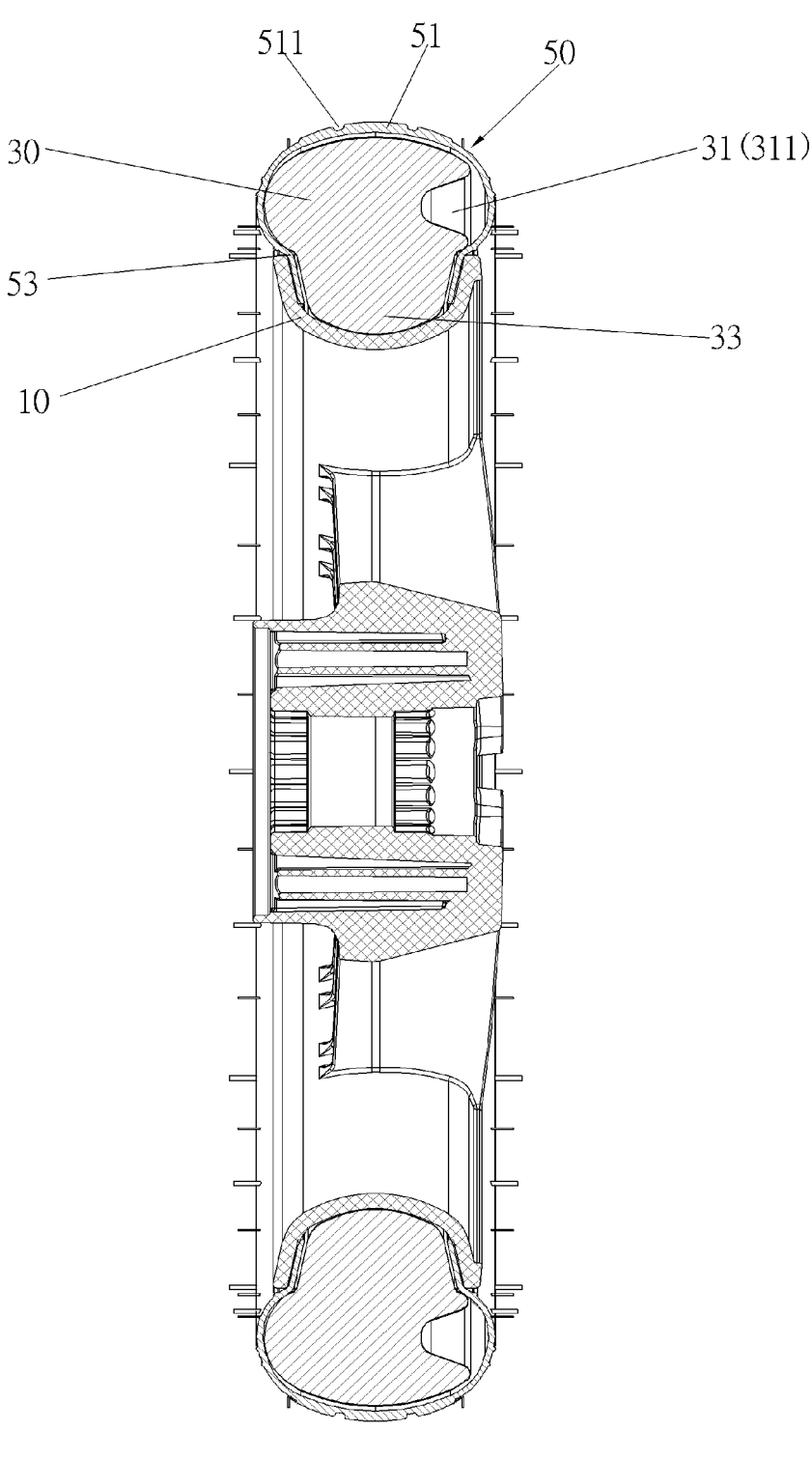
FIG. 3 is a cross-sectional diagram of the simulated inflatable wheel according to a first embodiment of the present invention.
Figure 4:
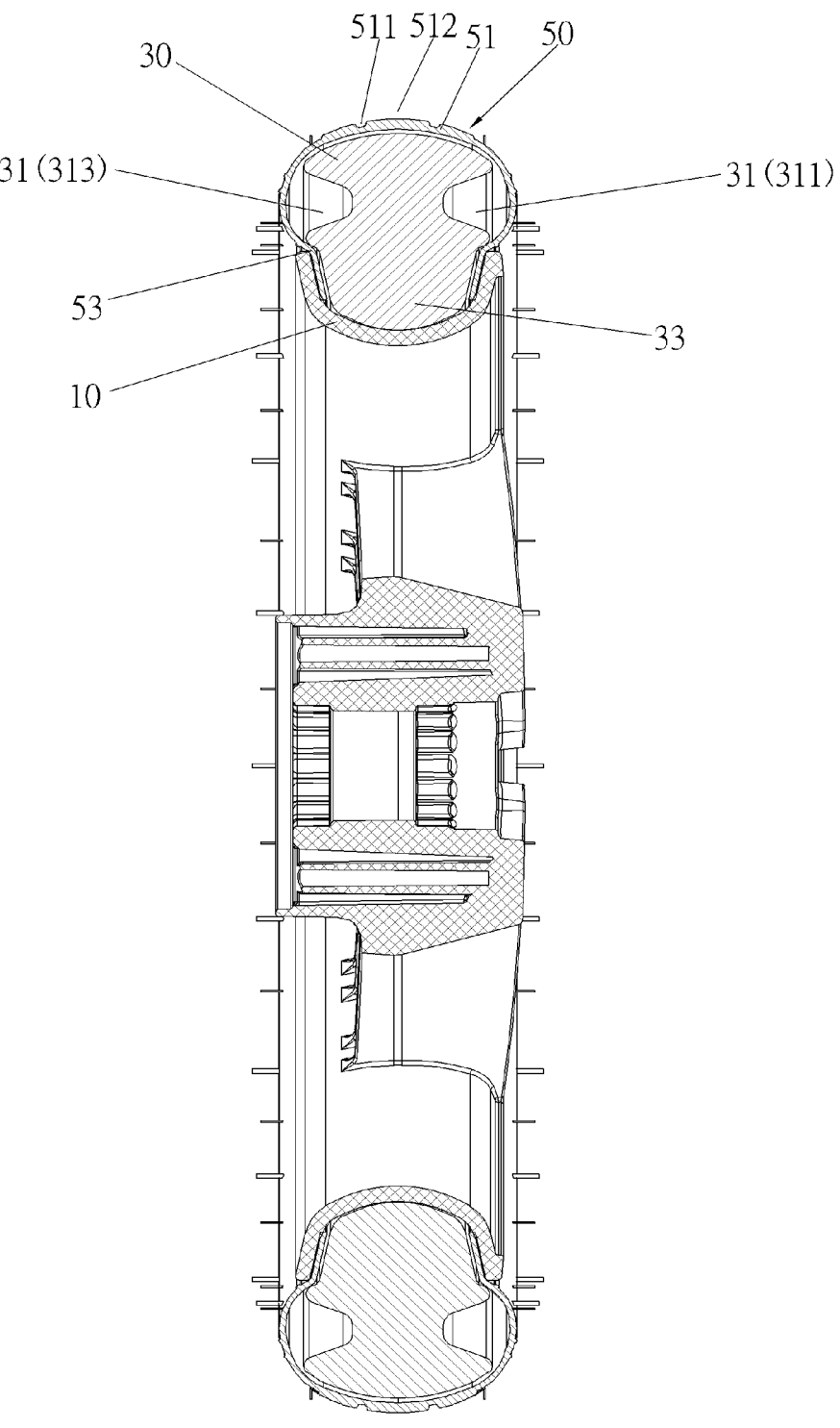
FIG. 4 is a cross-sectional diagram of the simulated inflatable wheel according to a second embodiment of the present invention.
Figure 5:
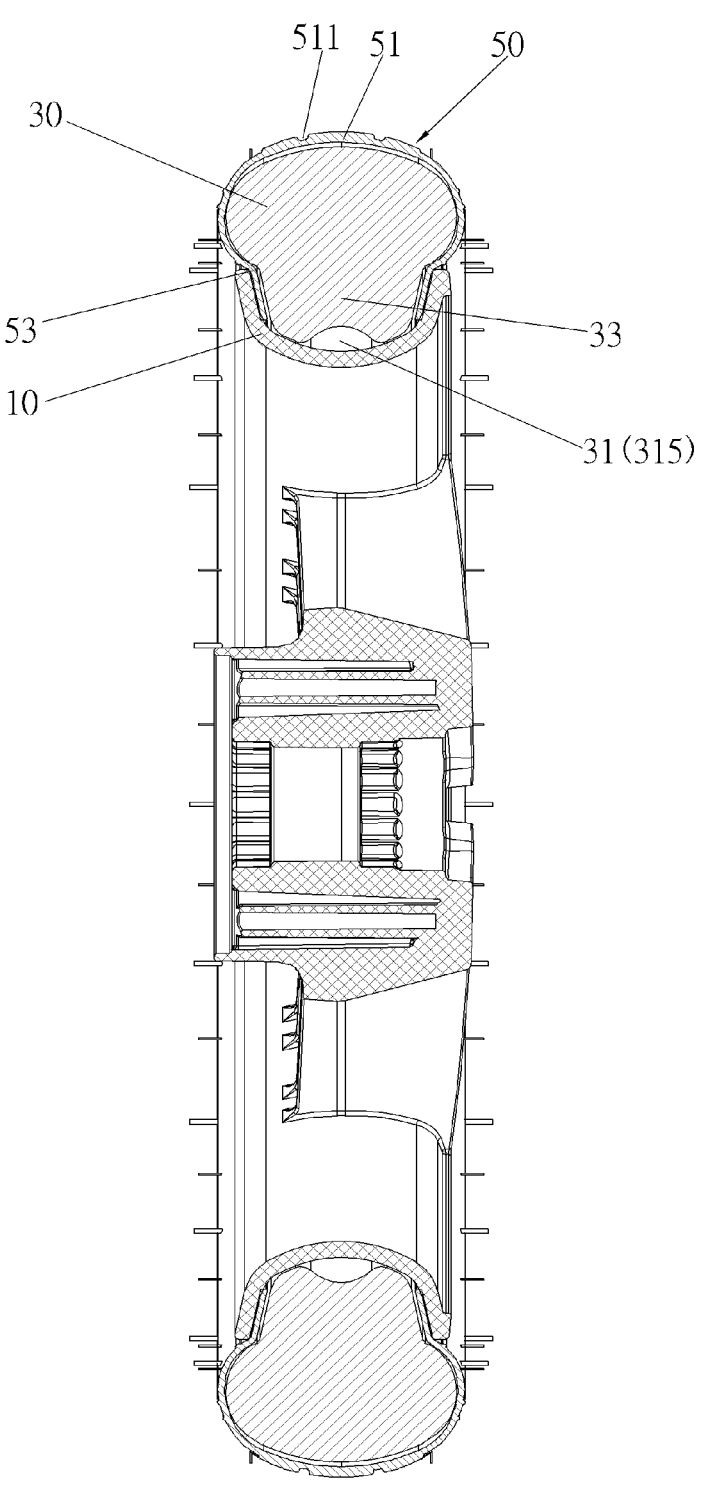
FIG. 5 is a cross-sectional diagram of the simulated inflatable wheel according to a third embodiment of the present invention.
Figure 6:
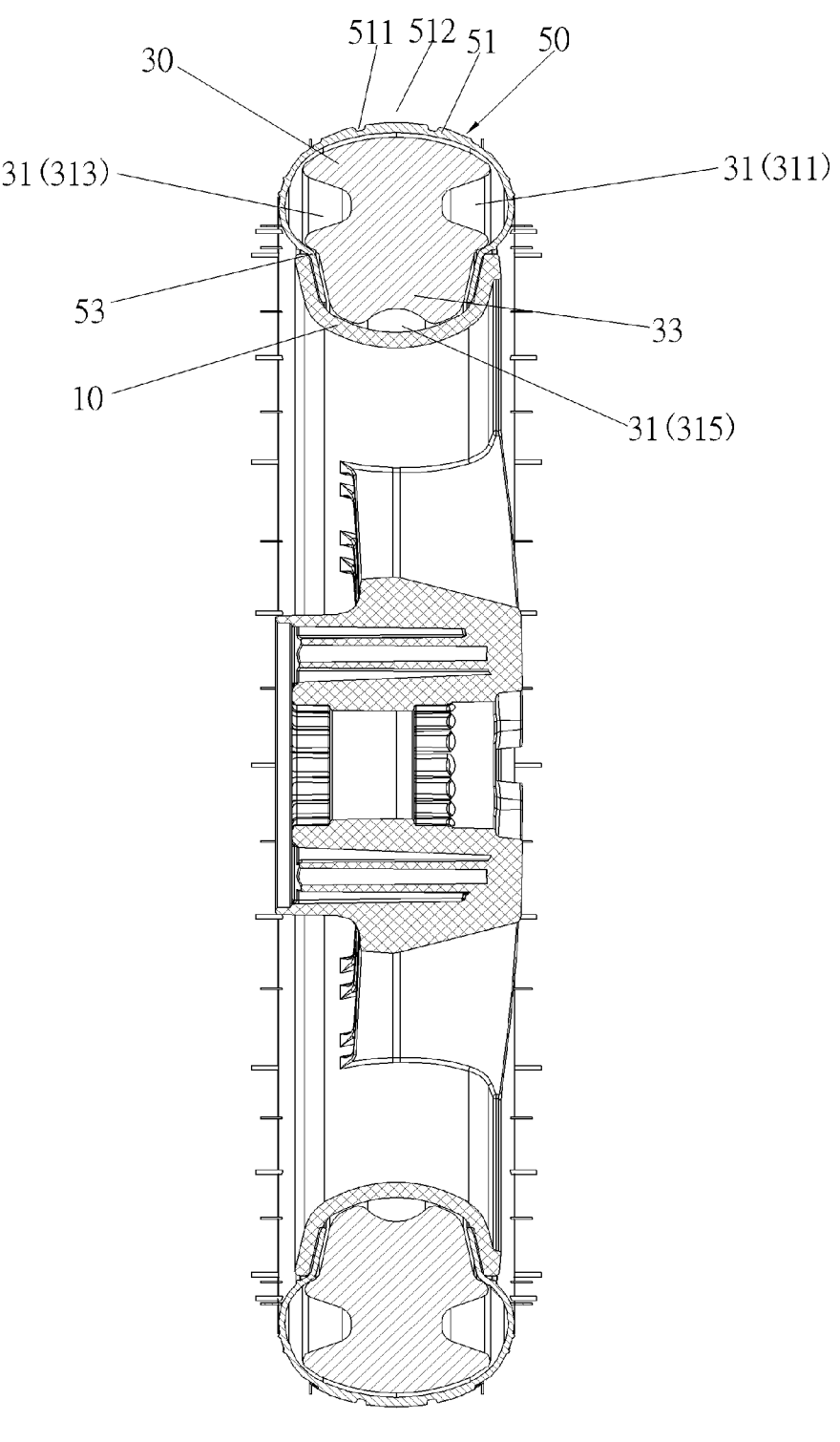
FIG. 6 is a cross-sectional diagram of the simulated inflatable wheel according to a fourth embodiment of the present invention.

Please refer to FIGS. 3-4. A recessed portion 31 is formed on at least one position of an outer surface of the filler tire 30. For example, the recessed portion 31 could be formed on one position (as shown in FIG. 3 or FIG. 5), two positions (as shown in FIG. 4), three positions (as shown in FIG. 6), or even six positions of the outer surface of the filler tire 30. To be specific, the recessed portion 31 is formed on at least one position where the outer surface of the filler tire 30 is in contact with the tire casing 50 and/or at least one position where the outer surface of the filler tire 30 is in contact with the rim 10. That is to say, the recessed portion 31 could be formed on one or more than one position where the outer surface of the filler tire 30 is in contact with the tire casing 50, or could be formed on one or more than one position where the outer surface of the filler tire 30 is in contact with the rim 10. In another embodiment, the recessed portion 31 could be formed on one or more than one position where the outer surface of the filler tire 30 is in contact with the tire casing 50, and could be formed on one or more than one position where the outer surface of the filler tire 30 is in contact with the rim 10. In one embodiment, the recessed portion 31 includes a first recessed groove 311 (as shown in FIG. 3). The first recessed groove 311 is formed on one position where the outer surface of the filler tire 30 is in contact with the tire casing 50 to provide buffer space between the filler tire 30 and the tire casing 50 for deformation of the filler tire 30, so as to increase elasticity of the filler tire 30. Furthermore, a second recessed groove 313 is formed on another position where the outer surface of the filler tire 30 is in contact with the tire casing 50 (as shown in FIG. 4) to provide buffer space between the filler tire 30 and the tire casing 50 for deformation of the filler tire 30, so as to increase elasticity of the filler tire 30. Preferably, the first recessed groove 311 and the second recessed groove 313 could be formed on positions where the outer surface of the filler tire 30 is in contact with the rolling portion 51. Of course, in another embodiment, there could be a plurality of recessed portions 31 formed on the whole rolling portion 51. To be specific, the first recessed groove 311 and the second recessed groove 313 could be disposed adjacent to the two abutting portions 33, respectively. As such, the present invention not only maintains the structural strength of the filler tire 30, but also provides buffer space for lateral deformation of the filler tire 30. To be more specific, the first recessed groove 311 and the second recessed groove 313 are disposed symmetrically along a center line 512 of the rolling portion 51 (as shown in FIG. 4), so as to make the filler tire 30 function stably and ensure uniform deformation of the filler tire 30 toward the first recessed groove 311 and the second recessed groove 313 for stabilizing elasticity of the filler tire 30.

Please refer to FIGS. 5-6. The recessed portion 31 includes a third recessed groove 315. In this embodiment, the third recessed groove 315 is formed on one position where the outer surface of the filler tire 30 is in contact with the rim 10. In another embodiment, there could be a plurality of third recessed grooves 315 formed on positions where the outer surface of the filler tire 30 is in contact with the rim 10. The third recessed groove 513 can provide buffer space between the filler tire 30 and the rim 10 for deformation of the filler tire 30, so as to increase elasticity of the filler tire 30. That is to say, there could be buffer space formed between the filler tire 30 and the rim 10, or there could be buffer space formed between the filler tire 30 and the tire casing 50. For example, there could be the first recessed groove 311 and/or the second recessed groove 313 formed between the filler tire 30 and the tire casing 50, or there could be the third recessed groove 315 formed between the filler tire 30 and the rim 10. In another embodiment, there could be buffer space formed between the filler tire 30 and the rim 10, and there could be buffer space formed between the filler tire 30 and the tire casing 50. For example, as shown in FIG. 6, there could be the first recessed groove 311 and/or the second recessed groove 313 formed between the filler tire 30 and the tire casing 50, and there could be the third recessed groove 315 formed between the filler tire 30 and the rim 10. To be specific, a protruding portion 33 extends from the filler tire 30 toward the rim 10, and the third recessed groove 315 is formed on the protruding portion 33. To be more specific, the first recessed groove 311 and the second recessed groove 313 are located at two sides of the third recessed groove 315, and the first recessed groove 311, the second recessed groove 313, and the third recessed groove 315 are arranged in an approximate triangle shape (preferably an isosceles triangle shape), so as to make the filler tire 30 function stably and ensure uniform deformation of the filler tire 30 toward the first recessed groove

311, the second recessed groove 313, and the third recessed groove 315 for stabilizing elasticity of the filler tire 30.

Compared with the prior art, the simulated inflatable wheel 100 of the present invention utilizes the recessed portion 31 formed on at least one position of the outer surface of the filler tire 30 to provide buffer space between the filler tire 30 and the rim 10 and/or buffer space between the filler tire 30 and the tire casing 50. In such a manner, the present invention can provide buffer space for deformation of the filler tire 30 to increase elasticity of the filler tire 30. Accordingly, the filler tire 30 of the simulated inflatable wheel 100 can have preferable elasticity.

The present invention further provides a stroller including the simulated inflatable wheel 100, such as a trolley or a hand-pull carriage. The stroller including the simulated inflatable wheel 100 provides the filler tire 30 with better elasticity, improves the anti-vibration effect and utilization safety, and has preferable practicality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A simulated inflatable wheel comprising:
   a rim;
   a filler tire mounted on the rim, the filler tire including a solid center core; and
   a tire casing covering the filler tire, the filler tire and the tire casing each being non-inflatable, and the tire casing having a rolling portion in rolling contact with an external environment and two abutting portions extending from two sides of the rolling portion respectively, the abutting portion being located between the rim and the filler tire, one side of the abutting portion abutting against the rim, another side of the abutting portion abutting against the filler tire;
   wherein a recessed portion is formed on at least one position of an outer surface of the filler tire, the recessed portion comprises:
      a first recessed groove formed on one position where the outer surface of the filler tire is in contact with the tire casing;
      a second recessed groove formed on another position where the outer surface of the filler tire is in contact with the tire casing; and
      a third recessed groove formed on one position where the outer surface of the filler tire is in contact with the rim, wherein the first recessed groove, the second recessed groove, and the third recessed groove are each disposed symmetrically about a centerline of the rolling portion, with the centerline extending centrally through the third recessed groove.

2. The simulated inflatable wheel of claim 1, wherein a protruding portion extends from the filler tire toward the rim, and the third recessed groove is formed on a surface of the protruding portion.

3. The simulated inflatable wheel of claim 1, wherein the first recessed groove and the second recessed groove are located at two sides of the third recessed groove, respectively.

4. The simulated inflatable wheel of claim 1, wherein the first recessed groove and the second recessed groove are formed on positions where the outer surface of the filler tire is in contact with the rolling portion.

5. The simulated inflatable wheel of claim 4, wherein the first recessed groove and the second recessed groove are disposed adjacent to the two abutting portions, respectively.

6. A stroller comprising:

a simulated inflatable wheel comprising:

a rim;

a filler tire mounted on the rim, the filler tire including a solid center core; and a tire casing covering the filler tire, the filler tire and the tire casing each being non-inflatable, and the tire casing having a rolling portion in rolling contact with an external environment and two abutting portions extending from two sides of the rolling portion respectively, the abutting portion being located between the rim and the filler tire, one side of the abutting portion abutting against the rim, another side of the abutting portion abutting against the filler tire;

wherein a recessed portion is formed on at least one position of an outer surface of the filler tire, the recessed portion comprises:

a first recessed groove formed on one position where the outer surface of the filler tire is in contact with the tire casing;

a second recessed groove formed on another position where the outer surface of the filler tire is in contact with the tire casing; and a third recessed groove formed on one position where the outer surface of the filler tire is in contact with the rim, wherein the first recessed groove, the second recessed groove, and the third recessed groove are each disposed symmetrically about a centerline of the rolling portion, with the centerline extending centrally through the third recessed groove.

7. The simulated inflatable wheel of claim 6, wherein a protruding portion extends from the filler tire toward the rim, and the third recessed groove is formed on a surface of the protruding portion.

8. The stroller of claim 6, wherein the first recessed groove and the second recessed groove are located at two sides of the third recessed groove, respectively.

9. The stroller of claim 6, wherein the first recessed groove and the second recessed groove are formed on positions where the outer surface of the filler tire is in contact with the rolling portion.

10. The stroller of claim 6, wherein the first recessed groove and the second recessed groove are disposed adjacent to the two abutting portions, respectively.

\* \* \* \* \*